United States Patent [19]

Tseng et al.

[11] 4,143,202

[45] Mar. 6, 1979

[54] ASH COATED CELLULAR GLASS PELLET

[75] Inventors: Eugene Tseng; Morton Bassin, both of Northridge, Calif.

[73] Assignee: Maryland Environmental Service, Annapolis, Md.

[21] Appl. No.: 725,699

[22] Filed: Sep. 23, 1976

[51] Int. Cl.$^2$ .................. C03C 17/22; C04B 31/44; B32B 17/06
[52] U.S. Cl. .................. 428/406; 106/40 V; 106/97; 106/98; 106/DIG. 1; 428/404
[58] Field of Search .................. 428/404, 406; 106/DIG. 1, 97, 98, 40 V

[56] References Cited

U.S. PATENT DOCUMENTS

| | | | |
|---|---|---|---|
| 2,987,406 | 6/1961 | Minnick | 106/DIG. 1 |
| 3,441,396 | 4/1969 | D'Eustachis et al. | 106/40 V |
| 3,562,370 | 2/1971 | Shannon | 106/40 V |
| 3,804,058 | 4/1974 | Messenger | 106/97 |
| 3,830,776 | 8/1974 | Carlson et al. | 106/DIG. 1 |
| 3,917,547 | 11/1975 | Massey | 428/406 |
| 3,963,503 | 6/1976 | Mackenzie | 106/40 V |
| 4,016,229 | 4/1977 | Tobin | 106/40 V |

Primary Examiner—O. R. Vertiz
Assistant Examiner—Mark Bell
Attorney, Agent, or Firm—Trask & Britt

[57] ABSTRACT

A foam glass pellet comprising a core of cellular glass and a coating of fine ash particles substantially enclosing said cellular glass core and bonded thereto is disclosed. The foam glass pellet is derived from a glass having a softening point less than 1250° C. The pellets have a median size of about 0.5 to about 20 millimeters and a bulk density of about 8 lbs/ft.$^3$ to about 50 lbs./ft.$^3$ pounds per cubic feet or higher if desired. The ash coating is substantially a mono particle thick layer of ash bonded to the foam glass core. Fly ash is a particularly effective ash for this purpose. Also disclosed are foam glass pellets wherein the core of cellular glass comprises a glass foam body having ash particles dispersed therein. The foam glass pellets of this invention have superior strength and are particularly useful as a light-weight aggregate in matrices such as concrete, thermosetting and thermoplastic organic polymer bodies, metals and gypsum and plaster materials.

10 Claims, No Drawings

ASH COATED CELLULAR GLASS PELLET

BACKGROUND OF THE INVENTION

1. Field of the Invention

The instant invention relates to cellular glass pellets having an ash coating bonded thereto which exhibit superior properties as lightweight aggregate for addition to various inorganic and organic matricies. Such pellets are lightweight and have a closed or open cell structure which renders them particularly useful as lightweight aggregate. Also, the lightweight pellets have particular utility as bulk insulation for hollow building walls and the like.

2. Prior Art

From glass pellets of various types have been made heretofore. Pellets have been made by crushing foam glass slabs to form an open-celled lightweight aggregate. Also, closed-cell pellets have been made by the technique disclosed in Vieli, U.S. Pat. No. 3,321,414. In the Vieli patent a mixture of ground glass and a solution containing an alkali metal silicate and an organic material is fed into a granulating device. The granulated particles or pellets leaving the granulating device have a diameter from about 0.5 to about 2.0 millimeters. The alkali metal silicate is present as a binder and organic material is added as a foaming agent. Granular material coming from the granulating device is fed together with a powdered release agent such as powdered corundum or powdered clay (bentonite) into a kiln whereby the organic material is decomposed, the glass softened and the pellet expanded up to five times its original diameter. Vieli indicates that the pellets tend to agglomerate as they expand.

In an article by C. D. Johnston, *The Journal of Testing and Evaluation*, Volume 2 No. 5, it is disclosed that crushed glass from bottles and the like were added to a cement mixture containing a certain portion of fly ash. The crushed glass did not significantly affect the density of the resulting concrete, and the addition of fly ash to the concrete only partially solved the problem of alkali attack upon the solid glass particle.

Further development of glass pellets or glass beads is disclosed in U.S. Pat. No. 3,365,315 of Beck wherein glass is cellulated to produce micro balloons, that is, small discrete bubbles of glass wherein the glass is cellular in shape and consists substantially of a single cell.

DESCRIPTION OF INVENTION

The cellular glass pellets of this invention are lightweight, multi-cellular, discrete particles having a bulk density of about 8 pounds per cubic foot to about 50 pounds per cubic foot or even higher if desired. The pellets have a substantially refractory coating of fine ash particles physically bonded to the surface of the pellet. The ash coating is substantially a layer of ash about one ash particle thick. The ash coated pellets are substantially spherical in shape and have a size which can be controlled during processing. The sizes vary from 0.5 mm to about 20 mm, although typically the size is from about 1.0 to about 10.0 mm, dependent upon the specific ASTM sizes and gradations required for a specific application. Ash may also be incorporated in the cellular glass body from about zero percent by weight up to about 75 percent by weight, although typically up to about 25 percent by weight of the glass pellet is used. Fly ash is a particularly effective ash for these purposes.

The ash coated pellets of this invention have a hard surface which is substantially abrasion resistant. This coating improves the moisture resistance and decreases the water absorption of the pellets. The coated glass pellets of this invention have improved hardness and compressive strength and improved workability in fluid systems such as pumpable concrete, and uncured thermoplastic and thermosetting resinous polymers.

The ash coated cellular glass pellets of this invention may also have fine ash particles incorporated in the pellet. The glass core of the pellet, with or without internal ash, has cellular pores of about 1 micron to about $10^4$ microns. The cells of the pellet are substantially closed cells so that moisture absorption and gas permeability are reduced. The abrasion resistant coating comprises ash particles of about 10 microns to about 300 microns in size. The ash particles may be either ceno-spheres or platelets in shape. The ceno-spherical shaped ash particle is generally preferred as a coating material, although the fly ash platelets are also very useful and provide a product superior to clays and other materials previously used as a coating on cellular glass particles.

The unique products of this invention are typically produced from a waste glass material as the core, however, the glass core may be formed from substantially any glassy or vitreous material which has a relatively low softening point, i.e., a softening point substantially less than that of the ash particles used to coat the glass core. Pristine or virgin glass of substantially any moderate to low softening point may be utilized, such as the soda-lime-silica glass used for window glass, bottles, jars and similar articles. Also useful are glasses obtained as a by-product from other processes such as furnace slag and oil shale residue, and naturally occurring glasses such as the volcanic glasses obsidian and pozzolan.

The cellular glass core of the pellets of the instant invention is preferably obtained from a waste glass cullet, that is, waste glass from bottles and other articles which have been crushed and sized to provide fine glass particles which pass through a 200 mesh screen. The waste glass material has a typical composition of:

| Material | Percent by Weight Range |
|---|---|
| $SiO_2$ | 60–75 |
| CaO and/or MGO | 5–10 |
| $Na_2O$ | 10–15 |
| $K_2O$ | 1–3 |
| C | Trace |

The waste glass cullet typically has a softening point of less than 950° C.

The waste glass generally has a small residue of organic or carbonaceous material absorbed or adherent thereto. The ease with which the waste glass particles expand to form cellulated particles indicates that the organic residue assists in the foaming action. The waste glass may also have some absorbed or unabsorbed water associated with it which may also assist in the foaming action. The waste glass particles readily expand into lightweight cellulated particles at elevated temperatures without addition of any foaming agent or binder, which is contrary to the traditional practice of foaming or expanding pristine glass particles.

Although the major constituents of the waste glass used in this invention are listed above, since the waste glass may come from many sources, other ingredients may be present, usually in minor quantities, such as:

aluminum oxide
titanium oxide
barium oxide
lead oxide
cobalt oxide
copper oxide
iron oxide
boron oxide
zinc oxide
sulfur or sulfates
chromium oxide and similar materials found in various specialty glasses and in metallic and metallic oxide coatings for glass.

Composites of glass (vitreous material) and metals may be utilized as the core of the novel coated pellets of this invention. Metal-glass composites are generally those of structural metals such as copper, aluminum, magnesium and the like with a glass material having a softening point approximating the metal melting point.

The waste glass preferably utilized in the instant invention comes from a municipal waste recovery plant. Municipal waste comprises organic (paper, plastic and waste food products primarily), metallic (ferrous and aluminum, primarily) and glass waste. Typically, the waste is wet, i.e., it has some significant moisture content. The presence of some moisture in the recovered glass waste is not greatly affected by the waste recovery process, i.e., whether a wet or dry waste recovery process is utilized.

In a wet waste recovery process municipal waste is ground (shredded) and passed through a magnetic separator to recover ferrous materials. The residue is then air-classified to remove the lighter materials (generally paper and drier food wastes) to be used as a fuel. The heavy fraction is passed to a mineral jig, i.e., a wet gravity separator, wherein the middle fraction is usually composed of glass, ceramics and stones. This middle fraction is dewatered, optionally dried, and directed to a glass processing unit, such as described hereinafter.

The first three steps of the dry waste recovery process, i.e., shredding, magnetic separation and air classifying, are similar to the wet process just described. After the air classifier, the material is screened to remove oversize material, then directed to a fluidized bed specific gravity table, which is a type of air classifier for separating heavier materials according to their density. Again, the middle fraction consists mostly of glass, ceramics and stones.

The fine ash particles in this invention generally have a low moisture content and, unlike clays, contain substantially no water of hydration. Although the chemical composition of the ash does not differ markedly from that of some clays, the ash forms a far superior coating for the cellular glass particles, especially for incorporation in inorganic matrices such as concrete, gypsum, plaster and the like. The absence of water of hydration in the ash may be a significant factor in its superior properties as a coating for cellular glass particles used as additives in concrete, gypsum and plaster.

The ash utilized in this invention has a typical chemical composition as follows:

| Material | Percent by Weight Range |
|---|---|
| $SiO_2$ | 35–55 |
| $Al_2O_3$ | 20–40 |
| $Fe_2O_3$ | 1–16 |
| CaO | 2–16 |
| MgO | 1–3.5 |

-continued

| Material | Percent by Weight Range |
|---|---|
| $K_2O$ | 2.0–5.5 |
| $SO_3$ | 0.5–2.5 |
| C | 0.1–10.0 |

The ash is preferably in the form of small spheres. A typical median particle size for the ash is from about 10.0 to about 80.0 microns. The ash has a bulk density of about 40 to about 100 lbs/ft$^3$.

The ash used in this invention may result from various combustion processes utilizing a fossil fuel containing a minor quantity of silica and other inorganic compounds, generally present as oxides, or as compounds containing various anions of chlorine and sulfur, including chlorites, chlorates, sulfur, sulfates and the like. The ash may be fly ash which is recovered from combustion stacks, chimneys, etc. or bottom ash which is removed from the hearth region of a furnace. Fly ash may generally be utilized in the instant invention without further processing. Also, fly ash has been found to provide pellets with outstanding properties. Bottom ash may require sizing and screening to obtain ash particles of the desired size. Also, bottom ash may require treatment to remove or neutralize excessive soluble alkaline or acidic compounds which failed to combust or were a product of the combustion, but did not become a part of the vitreous ash. For use in inorganic matrices, ash of a slightly acidic nature is generally preferred.

PROCESSING

Waste glass, which is primarily bottle glass of a soda-lime-silica composition is collected from a waste disposal plant wherein the glass is relatively free of organic matter and has been crushed to a rough size of particles having less than about a half inch maximum diameter, then placed in a ball mill or other device for reducing to a fine size. After crushing the glass to a fine size, it is screened over a 200 mesh screen. The material passing through the 200 mesh screen is retained for further processing while the over-sized material is returned for further size reduction. The minus 200 mesh glass particles are mixed on an inclined revolving pan or other pelletizing device with about 6 percent to about 10 percent by weight water, and preferably from about 7 to about 9 percent water.

The green glass agglomerates are then fed into the forward portion of a kiln or similar firing device wherein the agglomerates are thoroughly mixed with ash as a release agent. The ash coated agglomerates are then passed through the firing portion of the kiln wherein the temperature is raised to about 750° to about 900° C. for a period of about 15 minutes to one-half hour. At temperatures less than about 750° C. the pellets expand very little. At temperatures greater than 900° C. soda-lime-silica glass softens too much and the pellets are destroyed.

The fired, foamed pellets, now having a size range of about 0.5 to about 20 millimeters are preferably directed through a cooler before being passed over a screen whereby the very fine material, that is, material having a particle size less than about 0.5 millimeter is returned to be further pelletized and foamed.

The pellets produced from this process have a very fine and substantially uniform pore size with the pores having a diameter of about 1 micron for the small pellets to about $10^4$ microns for the larger pellets. The cellulated pellets have a minimum bulk density of about 8 pounds per cubic foot, which is obtained by maintaining the firing temperature and the residence time near the maximum. The density may range from about eight pounds per cubic foot up to substantially the density of solid glass, depending upon firing temperatures and residence time. The pellets further have a refractory coating of fine ash particles physically bonded to the surface. The ash coating is substantially one particle in thickness.

The ash-coated foamed glass particles have excellent abrasion resistance, excellent compressive strength and low moisture absorption; all important and useful properties when the material is used as bulk insulation. Also, these pellets have excellent adhesion and bonding characteristics when used as a lightweight aggregate in concrete.

If glass pellets are desired with ash particles as part of the cellular glass core, then ash is added to the glass before the pelletizing process. Ash may be added in any quantity up to about 75 percent by weight of the glass present, although typically not more than about 50% ash can be advantageously added. The formation of cellular pellets is more difficult to achieve with increasing ash content. Although ash itself may be cellulated, it cannot be accomplished at temperatures as low as 900° C., while temperatures higher than 900° C. destroy the foamed glass of a soda-lime-silica composition.

After the ash-glass agglomerates leave the pelletizing pan, they are then fed to a kiln where they are coated with ash as a release agent and fired similar to the process previously outlined. The same temperature and time limitations apply as with pellets having a waste glass core.

For the purpose of this invention, it is generally preferred to add not more than 50 percent by weight of ash to the glass particles. It is generally found that pellets having up to about 25 percent ash exhibit no significant decreases in strength while a strength loss is noted at levels of about 50 percent ash.

In the above-mentioned processes a binder such as sodium silicate can be added to assist in the agglomeration of the glass particles or the mixture of glass particles and ash on the pelletizing pan. It has been found that the glass particles which have a size of less than minus 200 mesh that no significant advantage is achieved in using a binder and some disadvantages may result. However, with larger sized glass particles, that is, particles having a size greater than 200 mesh, the addition of a binder such as a dilute sodium silicate solution is an agglomeration aid. However, with a binder it has been noted that the pore size of the resulting foam glass pellet is not as fine nor as uniform as pellets formed without a binder.

Also, generally it has been found that no foaming agent is required to be added in the process as previously outlined. However, if desired, a small amount of carbon black or other material which volatilizes or decomposes at temperatures less than about 900° C. but preferably at temperatures above about 700° C. can be added.

EXAMPLES

EXAMPLE 1

A waste glass, primarily of a soda-lime-silica bottle glass composition, was crushed, ground, and sized to have a particle size less than about 200 mesh. It was then mixed with sufficient water to bring the moisture content up to about 8 percent by weight and then agglomerated on an inclined pelletizing pan operated at an angle of about 30 degrees and revolved at about 60 R.P.M. Fine agglomerates having a median size of about 3 to 5 millimeters were formed. These agglomerates were then passed into a kiln and mixed with fly ash having a median particle size of about 40 microns. The forward portion of the kiln was unheated. The fly ash coated agglomerates are then passed into a fired kiln portion.

In the firing portion of the kiln the pellets had an average residence time of about ten minutes at 840° C. The foam pellets were discharged into a rotating water cooler and from there were discharged at a temperature less than about 200° F.

The foam glass pellets had an average diameter of about 4 to 7 millimeters and had a thin coating of fly ash substantially bonded thereto. A portion of the pellets were returned to the cooler and rotated for a sufficient period of time to substantially abrade away the fly ash coatings so that a comparison could be made between foam glass pellets with a fly ash coating and foam glass pellets with substantially no coating.

The foam glass pellets with the fly ash coating generally appeared to be stronger and more rigid than the pellets without a coating. Also, the moisture absorption and permeability of the ash coated pellets were much less than that of the uncoated pellets. Ash coated pellets and uncoated pellets were exposed to a moist atmosphere for a period of time sufficient to cause some disintegration of the uncoated pellets while the ash coated pellets showed no disintegration from the humid atmosphere.

The compressive strength of the individual ash coated foamed pellets varies exponentially with the density of the pellets, as illustrated in the following table.

TABLE I

| Specific Gravity | Compressive Strength (psi) |
| --- | --- |
| 0.2 | 100 |
| 0.3 | 300 |
| 0.4 | 700 |
| 0.5 | 1200 |
| 0.6 | 1800 |

The above data were obtained for foamed glass samples having up to about 15% by weight ash contained in the glass core.

EXAMPLE 2

Finely ground glass having a particle size less than about 200 mesh was prepared as in Example 1. To this was added about 25 percent by weight of fly ash. The mixture was then added to a pelletizing pan and then mixed with water to bring the moisture content up to about 8 percent by weight. Fine agglomerates having a median particle size of about 3 to 5 millimeters were formed.

The agglomerates were then fed to the forward portion of the kiln where they were admixed with fly ash to form a coating thereon and then passed to the fired portion of the kiln where the agglomerate had a residence time of about 20 minutes at about 850° C. The foam pellets being discharged from the kiln were then fed to a rotary cooler. The foamed and cooled glass pellets had an average size of about 4 to 7 millimeters. The pellets had good structural strength and were abrasion resistant. In qualitative tests the inclusion of fly ash in the core of the pellet appeared to improve the compressive strength of the pellet.

Similar results were obtained when the pellet core included five particles of bottom ash, aluminum, mullite, corundum, pozzolane, powdered shale and tungsten carbide.

EXAMPLE 3

Foam glass pellets made according to the instant invention were tested as a lightweight aggregate for addition to concrete. First, fly ash coated pellets made according to Example 1, were tested with glass pellets that had been made similar to Example 1 but wherein a clay (kaolin) was utilized instead of ash as a release agent which formed a coating on the glass pellets.

Various quantities of the pellets were added to the concrete to obtain comparable densities for concrete composites with the ash coated pellet and concrete composites with the clay coated pellet. Regardless of the density of the concrete body, the concrete with the ash coated pellets showed superior strength. The concrete appeared not to bond with the clay coated glass pellet, resulting in a heterogeneous system rather than a homogeneous system.

Uncoated glass pellets made according to this invention were compared to uncoated foamed pellets of a glass-ash composition. In each instance the matrix was concrete. In each instance, the foamed pellet of a glass ash composition performed better than the uncoated foam glass pellet in concrete. The strength of the concrete was about the same at a given density initially for either the glass pellet or the ash-glass pellet. However, upon aging, the concrete with the uncoated foam glass pellet lost strength.

Uncoated glass pellets with varying quantities of ash included in the foam glass core showed that the deterioration of strength by aging of the concrete-pellet composite was decreased by increasing the quantity of ash in the foam glass pellet core.

Ash coated glass pellets were added to concrete in various quantities. The density of the concrete decreased with the addition of the ash coated pellet, while strength of the concrete on a per weight basis increased.

The addition of the ash coated glass foam pellets of the instant invention to concrete produces a lightweight concrete with excellent strength to weight properties and improved insulative properties. Also, the addition of quantities of the ash coated pellets to hydraulic cement improves the pumpability of the cement.

The ash coated pellets of this invention form a strong cohesive bond with concrete.

EXAMPLE 4

Ash-containing pellets were added to molten polyvinyl chloride which was then formed into a sheet. The ash coated glass pellets were included up to about 85% by weight.

EXAMPLE 5

Fly ash coated glass pellets made from a waste glass composition were used as an expanded aggregate in a concrete mix. The concrete had the following composition:

| | |
|---|---|
| Cement | 639 lbs. |
| Sand | 1310 lbs. |
| Foam pellets | 557 lbs. |
| Added water | 350 lbs. |
| Absorbed water | 84 lbs. |

The ash coated glass pellets had the following characteristics:

| | |
|---|---|
| Particle Size | |
| Sieve size (inches) | Percent passing |
| 3/4 | 100 |
| 1/2 | 98.2 |
| 3/8 | 90.1 |
| 1/4 | 61.1 |
| No. 4 | 37.2 |
| No. 8 | 8.3 |
| Pan | 0.0 |
| Bulk density | 36.2 lbs/ft$^3$ |
| Specific gravity | 0.98 |
| Absorption at 1 hour | 25.8% |
| Deleterious substances | |
| (1) Organic impurities | None |
| (2) Staining materials | Light to moderate |
| (3) Clay and friable particles | 1.62% |
| (4) Loss on ignition | 3.11% |
| Lightweight Concrete Properties | |
| A. Compressive Strenght | |
| 3 days (average of 2) | 2610 psi |
| 7 days (average of 2) | 2930 psi |
| 28 days (average of 4) | 4270 psi |
| B. Unit Weight | |
| (1) Plastic state | 108 lbs/ft$^3$ |
| (2) Seven days moisture cure and 21 days air cure | 104.7 lbs/ft$^3$ |
| (3) Oven dry | 98.5 lbs/ft$^3$ |
| C. Splitting Tensive Strength (Average of 8) | 372 psi |
| D. Drying/Shrinkage (average of 3) | |
| (1) 7 days | 0.000% |
| (2) 14 days | 0.024% |
| (3) 21 days | 0.037% |
| (4) 28 days | 0.045% |
| (5) 35 days | 0.054% |
| E. Potential Alkali Reactivity | |
| (1) 14 days | 0.0000% |
| (2) 34 days | 0.0040% |
| (3) 54 days | 0.0256% |
| (4) 74 days | 0.0481% |
| (5) 94 days | 0.0736% |
| (6) 104 days | 0.0837% |

The above test was performed in accordance with AST M C-330. The lightweight concrete product exceeded the minimum standard set by the American Concrete Institute for a lightweight structural grade concrete, i.e., a compressive strength above 2500 psi and a density 115 lbs/ft$^3$ or lower.

The above test did not utilize any fly ash in the core of the glass pellet nor was any loose ash added. The alkali reactivity of the concrete with the ash coated glass pellets is further reduced by inclusion of additional ash in the concrete or in the core of the pellet.

The ash coated glass pellets of the above test greatly out-perform uncoated glass pellets as an aggregate for concrete. Uncoated glass pellets, foamed or in solid form, fail the alkali reactivity specification, upon aging, accompanied by a loss of strength.

The ash coated glass pellets have advantages over expanded shale and slate, which has a bulk density of about 45 to 55 lbs/ft$^3$, inasmuch as the density of the ash-glass pellets can be made lower.

The ash coated foam glass pellets are particularly useful as a lightweight filler or aggregate in gypsum board, plaster as well as various thermoplastic and thermosetting resinous materials, including coating materials. The pore structure enables the accurate formulation of finished materials with a predictable density inasmuch as the pellets absorb substantially none of the matrix material.

The ash coated foam glass pellets are especially compatible with the various organic and inorganic matrices.

The ash coated, foam glass pellets are particularly useful as bulk insulation material inasmuch as the pellets have excellent compressive strength and abrasion resistance and low moisture absorptivity and thermal conductivity. Also, the pellets may be made in various bulk densities as low as 8 lbs/ft$^3$.

We claim:

1. A foam glass pellet comprising:
   (a) a core of cellular glass;
   (b) a coating of fly ash substantially enclosing said cellular glass core and bonded thereto.

2. The foam glass pellet of claim 1 wherein said pellet is from about 0.5 to about 20 mm in diameter.

3. The foam glass pellet of claim 1 wherein said pellet has bulk density of about 8 to about 50 lbs/cu.ft.

4. The foam glass pellet of claim 1 wherein said pellet has an average pore size ranging between 1 micron to 10$^4$ microns.

5. The foam glass pellet of claim 1 wherein said ash coating comprises a substantially mono particle thick layer of ash.

6. The foam glass pellet of claim 5 wherein said ash particles have a thickness varying from about 10 to about 300 microns.

7. The foam glass pellet of claim 1 wherein said core of cellular glass comprises a glass foam body having ash particles dispersed therein.

8. The foam glass pellet of claim 7 wherein said glass foam is a waste foam.

9. The foam glass pellet of claim 8 wherein said ash is present up to about 75% by weight of the pellet.

10. The foam glass pellet of claim 1 wherein said core of cellular glass comprises a glass foam body having fine particles dispersed therein of materials selected from the class consisting of alumina, mullite, corundum, pozzolan, shale and tungsten carbide.

* * * * *